(12) United States Patent
Sato

(10) Patent No.: US 9,030,741 B2
(45) Date of Patent: May 12, 2015

(54) IMAGE STABILIZING APPARATUS, LENS BARREL, AND OPTICAL APPARATUS

(71) Applicant: Canon Kabushiki Kaisha, Tokyo (JP)

(72) Inventor: Koji Sato, Fukushima (JP)

(73) Assignee: Canon Kabushiki Kaisha (JP)

( * ) Notice: Subject to any disclaimer, the term of this patent is extended or adjusted under 35 U.S.C. 154(b) by 174 days.

(21) Appl. No.: 13/734,169

(22) Filed: Jan. 4, 2013

(65) Prior Publication Data

US 2013/0176620 A1  Jul. 11, 2013

(30) Foreign Application Priority Data

Jan. 6, 2012  (JP) ................... 2012-001064

(51) Int. Cl.
*G03B 5/00* (2006.01)
*G02B 27/64* (2006.01)
*G03B 5/02* (2006.01)
*G02B 27/00* (2006.01)

(52) U.S. Cl.
CPC .............. *G02B 27/646* (2013.01); *G03B 5/00* (2013.01); *G02B 27/00* (2013.01); *G03B 5/02* (2013.01); *G03B 2205/0015* (2013.01); *G03B 2205/0069* (2013.01)

(58) Field of Classification Search
CPC ...... G02B 27/00; G02B 27/64; G02B 27/644; G02B 27/646; G03B 5/00
USPC .......... 348/208.11; 396/55; 359/198.1, 221.2, 359/554, 557, 819
See application file for complete search history.

(56) References Cited

U.S. PATENT DOCUMENTS

| | | | |
|---|---|---|---|
| 2007/0133091 A1* | 6/2007 | Ito et al. .................. | 359/554 |
| 2007/0188868 A1* | 8/2007 | Fujinaka et al. ........... | 359/557 |
| 2009/0252484 A1* | 10/2009 | Hasuda .................... | 396/55 |
| 2010/0195206 A1* | 8/2010 | Miyamori et al. .......... | 359/557 |
| 2011/0234827 A1* | 9/2011 | Inoue et al. ............. | 348/208.11 |
| 2011/0317266 A1* | 12/2011 | Miyamori et al. .......... | 359/557 |

FOREIGN PATENT DOCUMENTS

| | | |
|---|---|---|
| JP | 05-297443 A | 11/1993 |
| JP | 2002-196382 A | 7/2002 |
| JP | 2007-017874 A | 1/2007 |
| JP | 2009-222899 A | 10/2009 |
| JP | 2010-271513 A | 12/2010 |
| JP | 2011-085754 A | 4/2011 |

* cited by examiner

*Primary Examiner* — Suchin Parihar
*Assistant Examiner* — William R Alexander
(74) *Attorney, Agent, or Firm* — Rossi, Kimms & McDowell LLP

(57) ABSTRACT

An image stabilizing apparatus includes a shift member holding a lens, a first driver moving the shift member in a first direction in a plane orthogonal to an optical axis, and a second driver moving the shift member in a second direction in the plane orthogonal to the optical axis. The first driver includes a first magnet, a first coil, and a first yoke in order in an optical axis direction, the second driver includes a second magnet, a second coil, and a second yoke in order in the optical axis direction, the first yoke has a protrusion that protrudes in the first direction at least one of end portions extending in a direction orthogonal to the first direction, and the second yoke has a protrusion that protrudes in the second direction at least one of end portions extending in a direction orthogonal to the second direction.

10 Claims, 6 Drawing Sheets

IMAGE STABILIZING APPARATUS, LENS BARREL, AND OPTICAL APPARATUS

BACKGROUND OF THE INVENTION

1. Field of the Invention

The present invention relates to an image stabilizing apparatus that performs a shift movement of a lens in order to correct an image blur.

2. Description of the Related Art

Previously, in an optical apparatus such as a digital camera or a digital video camera, a shift unit (an image stabilizing apparatus) that performs a shift movement of a lens in order to correct an image blur generated by a hand shake has been known. In Japanese Patent Laid-Open No. 2002-196382 discloses an image stabilizing apparatus that moves a correction lens unit. This image stabilizing apparatus is a shift unit of so-called moving coil type, which has a driving magnet disposed on a base member at a fixed side and has a yoke and a coil disposed on a shift member at a movable side.

Since a magnetic suction force acts between the driving magnet and the yoke, there is a position where the driving magnet and the yoke magnetically come into balance with each other. Accordingly, when a position relation between the driving magnet and the yoke is changed from the balanced position, a force that is to go back to an original position (a pulling force) acts. As a result, the shift unit that includes two drivers that drive the shift member in a vertical direction (a pitch direction) and a horizontal direction (a yaw direction) in a plane orthogonal to an optical axis generates the pulling force of one driver in accordance with the position change of the other driver.

Japanese Patent Laid-Open No. 2002-196382 discloses an image stabilizing apparatus that reduces a pulling force in a pitch direction driver. In this image stabilizing apparatus, a protrusion that protrudes in an optical axis direction is provided on a yoke. The strength of a force caused by magnetism is inversely proportional to the square of a distance. Therefore, when the shift member moves in the plane orthogonal to the optical axis and the distance between the driving magnet and the protrusion is changed, the pulling force that acts between the driving magnet and the protrusion acts in a direction in which the movement is facilitated.

However, since the pulling force is generated in the yaw direction driver in this case, a moment that rotates the shift member in the plane orthogonal to the optical axis is generated. Therefore, the shift member is freely rotated during the image stabilizing operation. When the shift member contacts a fixed member by the rotational motion, a collision noise is generated and an image may also be fussy. In addition, when a part is damaged by the contact, the drive of the shift member may be disturbed after that.

Japanese Patent No. 3229899 discloses an image stabilizing apparatus that is provided with a guide shaft that limits the rotation of a shift member in a plane orthogonal to the optical axis direction.

However, when the guide shaft as disclosed in Japanese Patent No. 3229899 is newly provided, the reduction in size of the image stabilizing apparatus is prevented. In addition, since the configuration of the apparatus is complicated and the number of parts is increased, it is difficult to reduce cost.

SUMMARY OF THE INVENTION

The present invention provides small-size image stabilizing apparatus, lens barrel, and optical apparatus that reduce a rotation of a shift member in a plane orthogonal to an optical axis at low cost.

An image stabilizing apparatus as one aspect of the present invention includes a shift member that holds a lens, a first driver configured to move the shift member in a first direction in a plane orthogonal to an optical axis with respect to a body, and a second driver configured to move the shift member in a second direction different from the first direction in the plane orthogonal to the optical axis with respect to the body. The first driver is configured by disposing a first magnet, a first coil, and a first yoke in order in an optical axis direction, the second driver is configured by disposing a second magnet, a second coil, and a second yoke in order in the optical axis direction the first yoke has a protrusion that protrudes in the first direction at least one of end portions extending in a direction orthogonal to the first direction, the second yoke has a protrusion that protrudes in the second direction at least one of end portions extending in a direction orthogonal to the second direction, a length of the first magnet in the first direction is smaller than a length between the end portions of the first yoke extending in the direction orthogonal to the first direction, and a length of the second magnet in the second direction is smaller than a length between the end portions of the second yoke extending in the direction orthogonal to the second direction.

A lens barrel as one aspect of the present invention includes the image stabilizing apparatus.

An optical apparatus as one aspect of the present invention includes the lens barrel.

Further features and aspects of the present invention will become apparent from the following description of exemplary embodiments with reference to the attached drawings.

DESCRIPTION OF THE PREFERRED EMBODIMENTS

Figure 1:
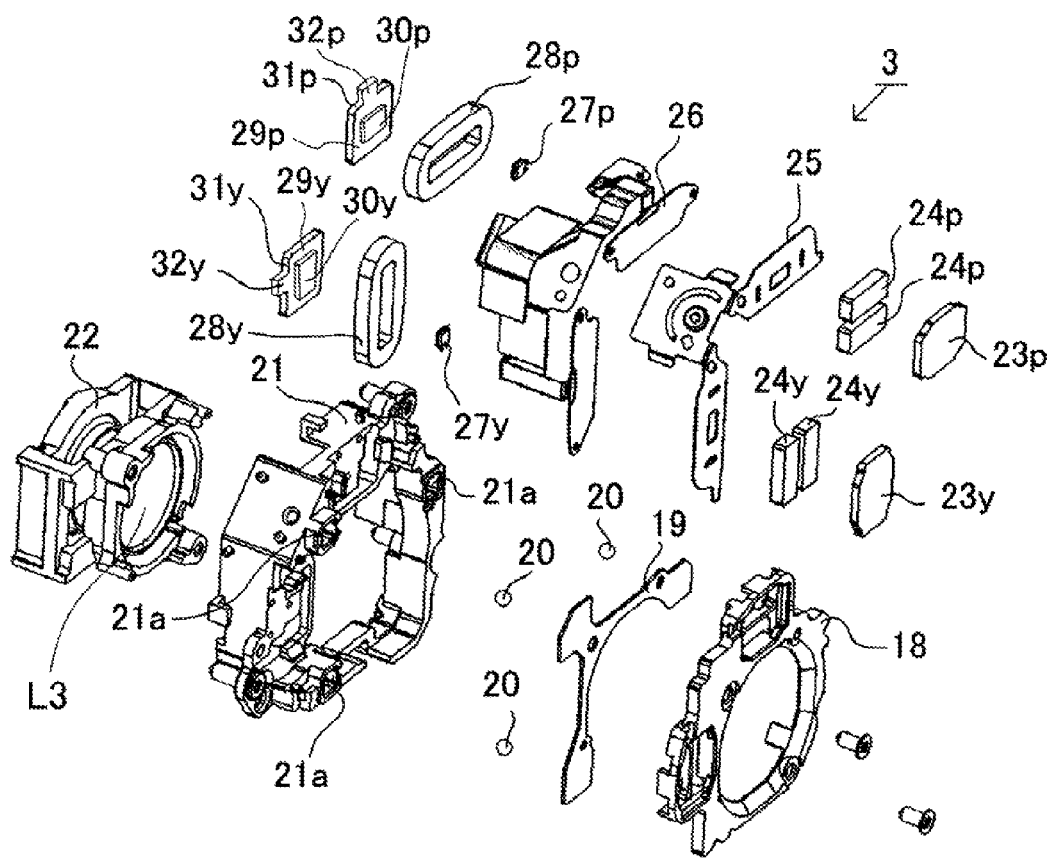
FIG. 1 is an exploded perspective view of a shift unit in the present embodiment.

Exemplary embodiments of the present invention will be described below with reference to the accompanied drawings. In each of the drawings, the same elements will be denoted by the same reference numerals and the duplicate descriptions thereof will be omitted.

Figure 2:
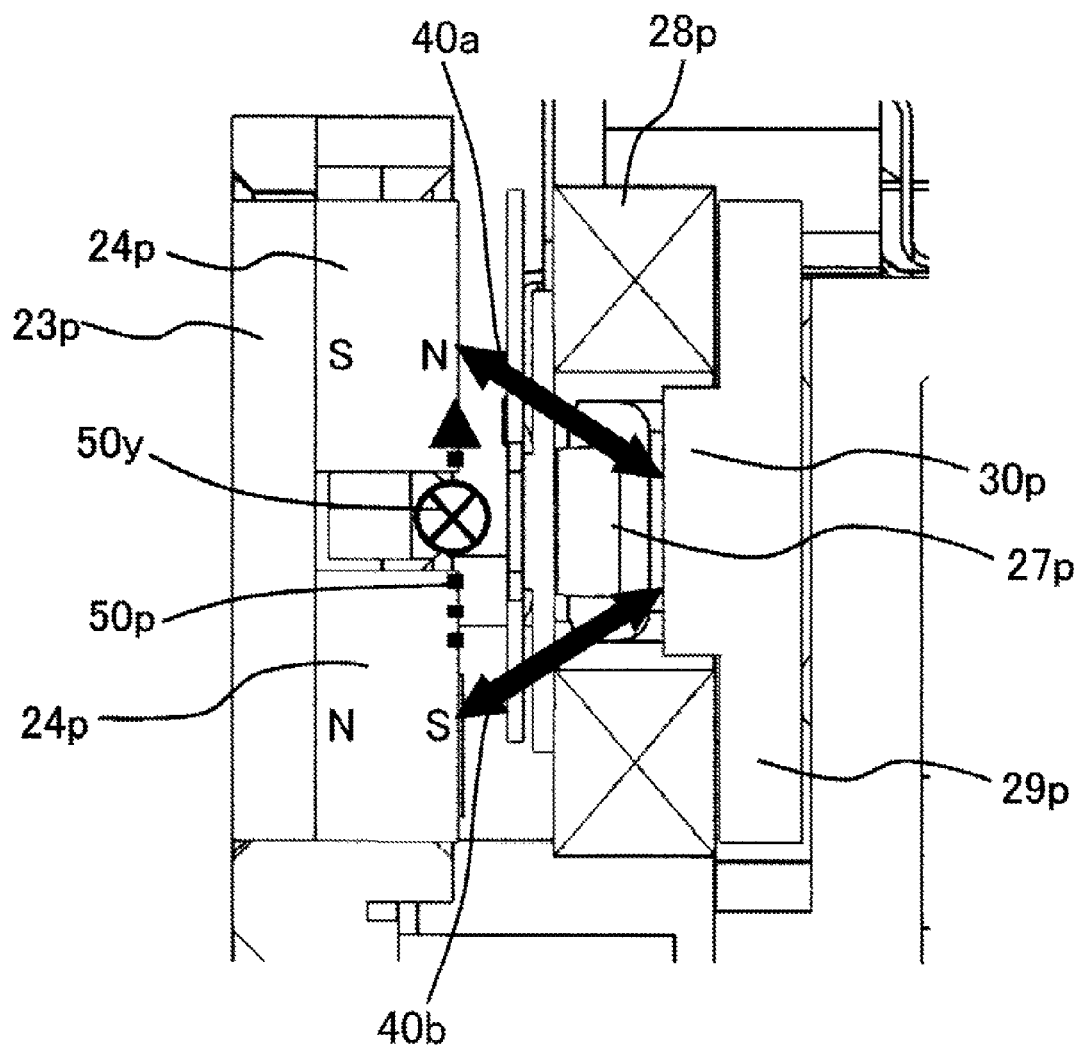
FIG. 2 is a cross-sectional view of a pitch direction driver of the shift unit in the present embodiment.

First of all, referring to FIGS. 1 and 2, a configuration of a shift unit 3 (an image stabilizing apparatus) that moves a lens L3 (a correction lens) in a direction orthogonal to an optical axis will be described. FIG. 1 is an exploded perspective view of the shift unit 3. FIG. 2 is an enlarged cross-sectional view of a pitch direction driver (a first driver) of the shift unit 3, which illustrates a case where a center of the lens L3 is located on an optical axis OA.

The lens L3 is driven in a plane orthogonal to the optical axis by a pitch direction driver (a pitch direction driving actuator) and a yaw direction driver (a yaw direction driving actuator). The pitch direction driving actuator is an actuator that corrects an image blur caused by an angle change in the pitch direction (a vertical direction of the lens barrel). The yaw direction driving actuator is an actuator that corrects an image blur caused by an angle change in the yaw direction (a horizontal direction of the lens barrel). The pitch direction driving actuator and the yaw direction driving actuator are independently controlled to be driven based on information from a position sensor and a shake detection sensor in each of the pitch direction and the yaw direction. The actuator and the position sensor for the pitch direction and the actuator and the position sensor for the yaw direction are disposed so as to make an angle that is nearly (substantially) orthogonal to each other (90 degrees). However, since their own configurations are the same, hereinafter, the configuration of the pitch direction will be only described and the configuration of the yaw direction will be omitted. Unless otherwise specifically instructed, indexes p and y are added to elements of the pitch direction and the yaw direction, respectively.

Reference numeral 22 denotes a shift moving frame that holds and displaces the lens L3 in the direction orthogonal to the optical axis in order to correct a shake (the image blur). Reference numeral 18 denotes a magnet base. A magnet 24$p$ that is used for both driving and position detection is pressed into and held by the magnet base 18. Since the magnet 24$p$ is pressed and built into the magnet base 18, a relative position relation between the magnet base 18 and the magnet 24$p$ is not displaced after the magnet base 18 is built into the magnet 24$p$. The magnet base 18 is fixed to the shift moving frame 22 with a screw. Therefore, a position of the magnet 24$p$ that also has a function of the position detection is determined at a position fixed with respect to the shift moving frame 22 that holds the lens L3, and the position of the lens L3 can be precisely detected by the magnet 24$p$. The shift moving frame 22 and the magnet base 18 are connected and fixed to each other using a screw in a state where a metal plate 19 is held between them. As a material of the metal plate 19, for example a stainless steel is suitably used. In the present embodiment, a shift member that holds the lens L3 is configured by the shift moving frame 22 and the magnet base 18.

Reference numeral 20 denotes a plurality balls that are disposed between a shift base 21 (a body) and the magnet base 18. In the present embodiment, three balls 20 are disposed in a plane orthogonal to the optical axis around the optical axis. These three balls 20 are held between the shift base 21 and the magnet base 18 by magnetic suction forces that act between a magnet 24$p$ and a yoke 29$p$ and between a magnet 24$y$ and a yoke 29$y$ as described below. The metal plate 19 described above is disposed between the balls 20 and the magnet base 18. Since the metal plate 19 is provided, the formation of dents caused by the balls on the magnet base 18 that is a mold part can be prevented when the lens barrel receives damage, and the deterioration of driving characteristics of the shift unit 3 caused by the attrition generated by a long-term image stabilizing drive can be prevented. The balls 20 are rotatably held by ball holders 21$a$ that are formed on the shift base 21. As a material of the balls 20, a non-magnetic material such as stainless steel or SUS304 is suitably used so as not to be absorbed to the magnet 24 that is located near the balls 20.

A force that surely contacts the balls 20 with the shift base 21 (an end surface of the ball holder 21$a$ in the optical axis direction) and the magnet base 18 (the metal plate 19) is the magnetic suction force that acts between the magnet 24$p$ and the yoke 29$p$ (a fixed yoke). When the magnet base 18 is biased by this magnetic suction force in a direction where the magnet base 18 is closer to the shift base 21, the three balls 20 contact the end surfaces of the three ball holders 21$a$ and three regions of the metal plate 19 in a pressing state. Each of the surfaces on which the three balls 20 contact expands in a direction orthogonal to the optical axis OA of an image pickup optical system. Nominal diameters of the three balls 20 are the same. Therefore, if position differences in the optical axis direction between the end surfaces of the optical axis direction in the three ball holders 21$a$ are reduced, the lens L3 held by the shift moving frame 22 can be moved in the plane orthogonal to the optical axis without generating an inclination with respect to the optical axis OA. Thus, in the present embodiment, when the plurality of balls 20 perform rolling motions in the plane orthogonal to the optical axis, the shift moving frame 22 and the magnet base 18 perform shift movements in the plane orthogonal to the optical axis.

Next, an actuator (a driver) that drives the magnet base 18 (the shift member) and the lens L3 will be described. The actuator of the present embodiment is configured by a first driver and a second driver that move the shift member with respect to the body (the shift base 21) in a first direction and a second direction in a plane orthogonal to the optical axis, respectively. In the present embodiment, the first direction and the second direction are the direction orthogonal to each other in the plane orthogonal to the optical axis, and for example the first direction is a pitch direction and the second direction is a yaw direction, but the present embodiment is not limited to this. The first driver is configured by disposing a magnet 24$p$ (a first magnet), a coil 28$p$ (a first coil), and a yoke 29$p$ (a first yoke) in order in the optical axis direction, more specifically in a direction from a front side of the optical axis direction toward a rear side of the optical axis direction. Similarly, the second driver is configured by disposing a magnet 24$y$ (a second magnet), a coil 28$y$ (a second coil), and a yoke 29$y$ (a second yoke) in order in the optical axis direction, more specifically in the direction from the front side of the optical axis direction toward the rear side of the optical axis direction. Each of the first driver and the second driver may also be configured by the magnet, the coil, and the yoke in order in a direction from the rear side of the optical axis direction toward the front side of the optical axis direction.

In the present embodiment, a protrusion 32$p$ that protrudes in the first direction is formed on the yoke 29$p$ at a center of an end portion 31$p$ (one side) extending in a direction orthogonal to the first direction. Similarly, a protrusion 32$y$ that protrudes in the second direction is formed on the yoke 29$y$ at a center of an end portion 31$y$ (one side) extending in a direction orthogonal to the second direction.

As illustrated in FIG. 2, the magnet 24$p$ is magnetized to form two magnetic poles in a radiation direction from the optical axis, and the yoke 23$p$ closes magnetic flux of the magnet 24$p$ at a front side of the optical axis direction. The yoke 23$p$ is absorbed onto and fixed to the magnet 24$p$. The yoke 23$y$ closes magnetic flux of the magnet 24$y$ at a front side of the optical axis direction. The yoke 23$y$ is absorbed onto and fixed to the magnet 24$y$. The coil 28$p$ adheres to and is fixed to the shift base 21. The yoke 29$p$ is a fixed yoke that closes the magnetic flux of the magnet 24$p$ at a rear side of the optical axis direction. The yoke 29$p$ is disposed at a side opposite to the magnet 24$p$ with respect to the coil 28$p$, and is held by the shift base 21. The yoke 29$p$ has a protrusion 30$p$ that protrudes in the optical axis direction and to a side of the magnet 24$p$ (a side of the first magnet). Similarly, the yoke 29$y$ has a protrusion 30$y$ that protrudes in the optical axis direction and to a side of the magnet 24$y$ (a side of the second magnet).

A magnetic circuit is configured by the magnet 24$p$, the yoke 23$p$, the yoke 29$p$, and the coil 28$p$. As a material that is used for the yoke 23$p$ and the yoke 29$p$, for example a magnetic material such as SPCC, which has a high magnetic permeability, is suitably used. When a current is applied to the coil 28p, Lorentz force is generated by mutual repulsion of the magnetic field lines generated in the magnet 24p and the coil 28p in a direction nearly orthogonal to, i.e. a direction which is evaluated as a substantially orthogonal to, the magnetized boundary of the magnet 24p. According to this force, the magnet base 18 moves in the direction orthogonal to the optical axis. Thus, the actuator of the present embodiment is a so-called moving magnet actuator.

Since the actuator having such configurations is disposed in each of a vertical direction and a lateral direction, the magnet base 18 and the shift moving frame can be driven in two directions that are nearly (substantially) orthogonal to each other and that are orthogonal to the optical axis. In addition, combining the drives in the vertical direction and the lateral direction, the magnet base 18 and the shift moving frame 22 can be freely moved within a predetermined range in a plane orthogonal to the optical axis. The friction that is generated when the magnet base 18 moves in the direction orthogonal to the optical axis is only rolling frictions that generate between the balls 20 and the metal plate 19 and between the balls 20 and the ball holders 21a if the balls 20 do not contact walls of the ball holders 21a. Therefore, the magnet base 18, i.e. the shift moving frame 22 that holds the lens L3, can smoothly move in the plane orthogonal to the optical axis and can also perform a control of a small movement amount despite the action of the absorption force (the suction force). When lubrication oil (grease) is applied to the balls 20, the friction force can be further reduced.

Next, the position detections of the magnet base 18 and the lens L3 will be described. Reference numerals 27p and 27y denote hall elements that convert magnetic flux density into an electric signal. The soldering of the hall element 27p is performed for an FPC 26 (flexible printed circuit). The FPC 26 is fixed to the shift base 21 so that the positioning of the FPC 26 is performed for the shift base 21. Furthermore, fixing an FPC clamp 25 to the shift base 21 using a screw, the floating of the FPC 26 is prevented and also a position displacement of the hall element 27p is prevented. A position sensor that detects the positions of the magnet base 18 and the lens L3 is configured by the hall element 27p and the magnet 24p. When the magnet base 18 and the lens L3 are driven in the vertical direction and the lateral direction, the change of the magnetic flux density of the magnet 24p is detected by the hall element 27p, and an electric signal indicating the change of this magnetic flux density is outputted. A control circuit (not shown) detects the positions of the magnet base 18 and the lens L3 based on an output of the hall element 27p. The magnet 24p is used as a position detection magnet as well as a driving magnet.

The absorption force that acts between the magnet 24p and the yoke 29p is, as indicated by Coulomb's law, proportional to an intensity of a magnetic charge and an inverse of the square of the distance of two objects. Therefore, when the magnet 24p is located at a center position of the driver, each of the absorption forces in the pitch direction and the yaw direction comes into balance in each direction. In other words, absorption forces 40a and 40b that act between the magnet 24p and the protrusion 30p of the yoke 29p come into balance with each other, and the position relation between the magnet 24p that is the driving magnet and the yoke 29p is determined. In this case, a pulling force 50p in the pitch direction (an upward direction in FIG. 2) is nearly equal to zero, and also a pulling force 50y in the yaw direction (a direction orthogonal to a paper plane in FIG. 2) is nearly equal to zero.

Figure 3A:
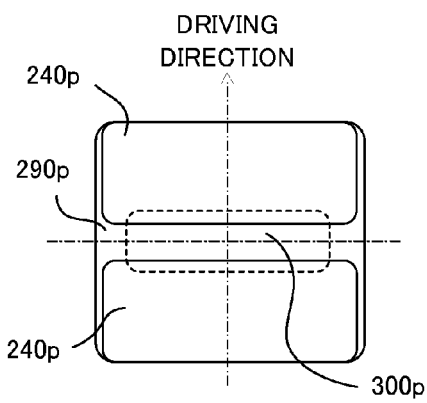
FIGS. 3A to 3E are diagrams of describing pulling forces of a conventional shift unit.
Figure 3B:
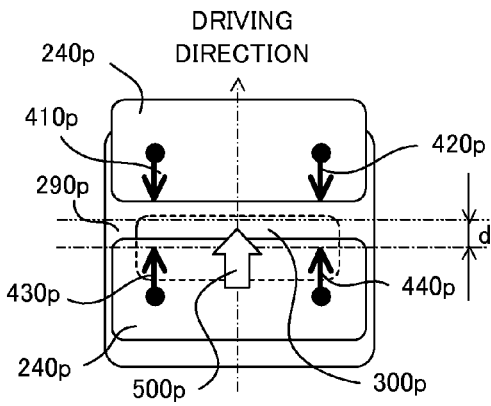
Figure 3C:
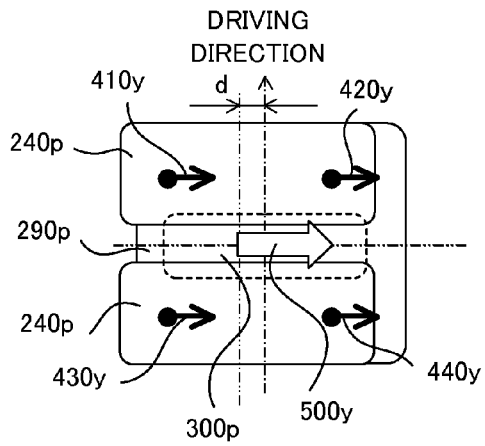
Figure 3D:
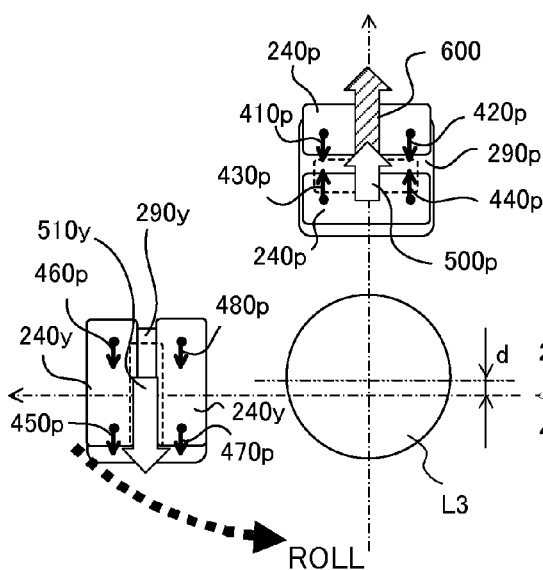
Figure 3E:
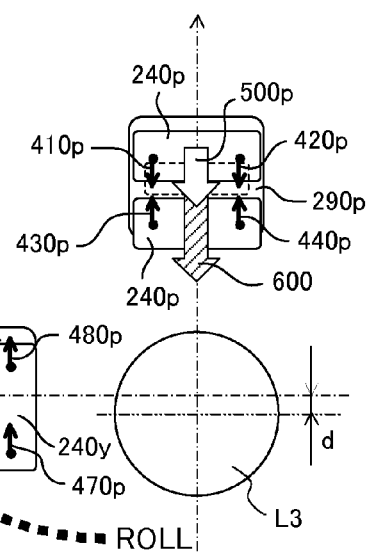

Next, referring to FIGS. 3A to 3E, a relation between a movement and a pulling force caused by an absorption force of a conventional shift unit (a driver and a shift member) will be described. FIGS. 3A to 3E are diagrams of describing the pulling force of the conventional shift unit. FIGS. 3A to 3C are diagrams of a pitch direction driver and FIGS. 3D and 3E are diagrams of the driver and the shift member of the pitch direction and the yaw direction, each of which is viewed from a front side (an object side) of the shift unit. In FIGS. 3A to 3E, members other than a magnet 240 (a driving magnet), a yoke 290, a protrusion 300, and a lens L3 (a correction lens) are omitted. As illustrated in FIGS. 3A to 3E, the protrusion 300 of the yoke 290 in the conventional art has a substantially-rectangular projection shape on the plane orthogonal to the optical axis. The pulling forces that act on four corners of a magnet 240p are denoted as pulling forces 410, 420, 430, and 440 respectively. Similarly, the pulling forces that act on four corners of a magnet 240y are denoted as pulling forces 450, 460, 470, and 480 respectively.

FIG. 3A illustrates the pitch direction driver when the center of the lens L3 is located on the optical axis. In this case, since the magnet 240p is located at a center position with respect to the yoke 290p, the pulling forces 410, 420, 430, and 440 at the corner portions come into balance with each other. In other words, a pulling force 500p in the pitch direction and the pulling force 500y in the yaw direction are nearly equal to zero. FIG. 3B illustrates the pitch direction driver when the center of the lens L3 is moved by a distance d in the pitch direction (an upward direction). As described above, since the strength of the force caused by magnetism is inversely proportional to the square of the distance, the pulling forces 430p and 440p are larger than the pulling forces 410p and 420p that act with respect to the protrusion 300p. Accordingly, the pulling force 500p acts in a direction in which the movement is facilitated. Since shapes of the magnet 240p and the protrusion 300p are symmetric with respect to the driving direction, the strengths of the pulling forces 410p and 420p are nearly equal to each other and also the strengths of the pulling forces 430p and 440p are nearly equal to each other. Since it does not move in the yaw direction, the pulling force 500y is nearly equal to zero similarly to the case of FIG. 3A.

Next, FIG. 3C illustrates the pitch direction driver when the center of the lens L3 is moved by the distance d in the yaw direction. Also in this case, the pulling force 500y is generated by the change of the position relation between the magnet 240p and the protrusion 300p. In other words, a force in a direction in which the state is returned to the state of FIG. 3A that is magnetically stable acts. Since the shapes of the magnet 240p and the protrusion 300p are symmetric with respect to the driving direction, the strengths of the pulling forces 410y and 430y are nearly equal to each other, and also the strengths of the pulling forces 420y and 440y are nearly equal to each other. Since it does not move in the pitch direction, the pulling force 500p is nearly equal to zero similarly to the case of FIG. 3A.

FIG. 3D illustrates a case where the center of the lens L3 is moved by the distance d in the pitch direction. As described with reference to FIG. 3B, the pulling force 500p in the pitch direction acts on the magnet 240p, but the movement of the shift member is possible according to Lorentz force 600 that is generated by applying the current to a coil (not shown). On the other hand, as described with reference to FIG. 3C, the pulling force 510y acts on the magnet 240y at the yaw side. A rotation moment (a torque) around an axis that is parallel to the optical axis acts on the shift member by the pulling force 510y. As a result, as illustrated in FIG. 3D, a rolling motion in a counterclockwise direction is generated in the shift member. Then, the shift member stops at a position where all of the rotation moment, the pulling forces 450p, 460p, 470p, and 480p, the Lorentz force, and the like come into balance with each other.

FIG. 3E illustrates a case where the center of the lens L3 is moved by the distance d in a direction opposite to the direction of FIG. 3D. Similarly to FIG. 3D, the rotation moment (the torque) around the axis that is parallel to the optical axis acts on the shift member in accordance with the pulling force 510y generated in the magnet 240y and the protrusion 300y at the yaw side. As a result, as illustrated in FIG. 3E, a rolling motion in a clockwise direction is generated in the shift member. Then, the shift member stops at a position where all of the rotation moment, the pulling forces, the Lorentz force, and the like come into balance with each other.

Figure 6:
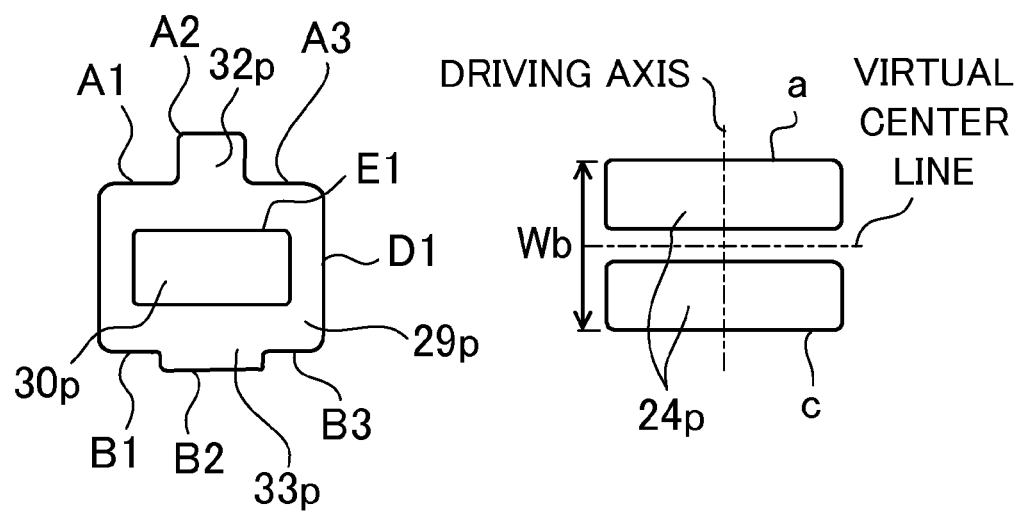
FIG. 6 is a diagram of illustrating a yoke of another example in the present embodiment.

Next, referring to FIGS. 4A to 4G and 6, a relation between a movement and a pulling force caused by an absorption force of the shift unit (the driver and the shift member) in the present embodiment will be described. FIGS. 4A to 4G are diagrams of the pulling force of the shift unit in the present embodiment. FIGS. 4A and 4E to 4G are diagrams of a driver of the pitch direction and FIGS. 4B to 4D are diagrams of the driver and the shift member of the pitch direction and the yaw direction, each of which is viewed from a front side (an object side) of the shift unit. FIG. 6 is a diagram of a yoke of another example in the present embodiment. In FIGS. 4A to 4G and 6, members other than the magnet 24 (the driving magnet), the yoke 29, the protrusion 30, and the lens L3 are omitted.

Figure 4A:
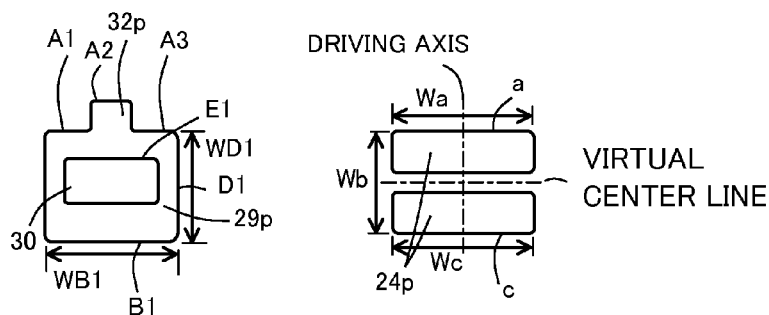
FIGS. 4A to 4G are diagrams of describing pulling forces of the shift unit in the present embodiment.
Figure 4B:
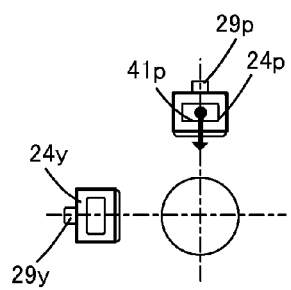
Figure 4C:
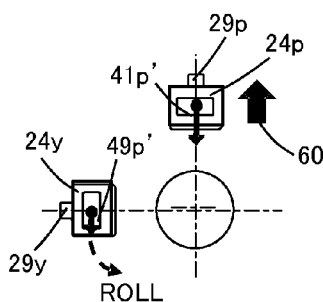
Figure 4D:
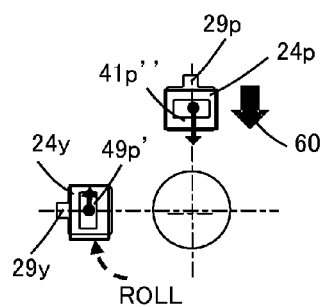

In the present embodiment, as illustrated in FIG. 4A, a width Wa (a width Wc) of the magnet 24p in a longitudinal direction is equal to a width WB1 of the yoke 29p in the longitudinal direction. The longitudinal direction is a direction that is orthogonal to a direction of the driving axis (the driving direction) in the plane orthogonal to the optical axis. In other words, the width Wa of the magnet 24p in a direction orthogonal to a first direction (the driving direction) is equal to the width WB1 of an end portion B1 of the yoke 29p that extends in the direction orthogonal to the first direction. That is to say, a length Wa (a length Wc) of the magnet 24p in the direction orthogonal to the first direction is equal to a length WB1 of the end portion B1 of the yoke 29p that extends in the direction orthogonal to the first direction. The term "equal" means a case in which they are nearly equal to each other (Wa ≑ WB1) in addition that a case in which they are exactly equal to each other. Similarly, a width of the magnet 24y in a direction orthogonal to a second direction (the driving direction) is equal to a width of an end portion of the yoke 29y that extends in the direction orthogonal to the second direction. That is to say, a length of the magnet 24y in the direction orthogonal to the second direction is equal to a length of the end portion of the yoke 29y that extends in the direction orthogonal to the second direction.

A total width (a length) Wb of the magnet 24p in a lateral direction and a width WD1 of the yoke 29p in the lateral direction meet a relation of Wb<WD1. The lateral direction is a direction that is parallel to the driving direction in the plane orthogonal to the optical axis. In other words, the total width (the length) Wb of the magnet 24p in the first direction is smaller than the width WD1 of the end portion D1 of the yoke 29p that extends in the first direction (a length between end portions A1 and A3 extending in the direction orthogonal to the first direction and the end portion B1 of the yoke 29p). Similarly, the total width (the length) of the magnet 24y in the second direction is smaller than the width of the end portion of the yoke 29y that extends in the second direction (a length between both end portions of the yoke 29y extending in the direction orthogonal to the second direction).

FIG. 4B illustrates a state in which the shift member is held at a center position of the optical axis. FIG. 4C is a diagram of illustrating a state where the shift member is displaced in an upward direction of the pitch direction relative to the center position of the optical axis. FIG. 4D is a diagram of illustrating a state where the shift member is displaced in a downward direction of the pitch direction relative to the center position of the optical axis. Since each of the widths Wa and WB1 of the magnet 24p and the yoke 29p in the yaw direction meets the relation of Wa ≑ WB1, the pulling force is not generated in any cases of FIGS. 4B to 4D. On the other hand, in the cases of FIGS. 4C and 4D, pulling forces 49p' and 49p" are generated in accordance with the relative position shift between the magnet 24y and the yoke 29y caused by the Lorentz force 60, respectively. Therefore, a moment is generated so as to go back to the positions of the magnet 24y and the yoke 29y illustrated in FIG. 4B.

Figure 4E:
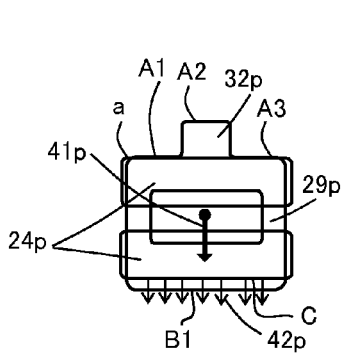

Hereinafter, referring to FIGS. 4E to 4G, pulling forces 41p, 41p', and 41p" that are generated in the pitch direction in the case of FIGS. 4B to 4D, respectively, will be described in detail. FIG. 4E is a diagram of illustrating the position relation between the magnet 24p and the yoke 29p in the case where the shift member is held at the center position of the optical axis (FIG. 4B). An end portion a of the magnet 24p in the longitudinal direction, i.e. an end portion at the side farthest from the lens L3, is located at nearly the same position as the end portions A1 and A3 of the yoke 29p. An end portion c of the magnet 24p in the longitudinal direction, i.e. an end portion at the side closest to the lens L3, is located at an upper side relative to an end portion B1 (the end portion at the side closest to the lens L3) of the yoke 29p, i.e. is located at the side farther than the lens L3. In this case, since the end portion a of the magnet 24p is located at nearly the same position as the positions of the end portions A1 and A3 of the yoke 29p, the pulling force is not generated. However, since the end portion c of the magnet 24p is located at an inner side (an upper side) of the yoke 29p relative to the end portion B1 of the yoke 29p, the pulling force 42p is generated in a downward direction in the drawing. Therefore, the pulling force 41p is generated between the magnet 24p and the yoke 29p in the downward direction in the drawing.

Figure 4F:
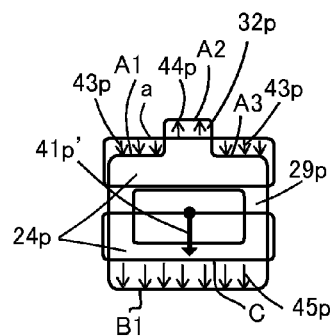

FIG. 4F is a diagram of illustrating the position relation between the magnet 24p and the yoke 29p in the case where the shift member is displaced in the upward direction of the pitch direction relative to the center position of the optical axis (FIG. 4C). Since the end portion a (the end portion extending in the direction orthogonal to the first direction) of the magnet 24p protrudes upward in the drawing with respect to the end portions A1 and A3 (the end portions extending in the direction orthogonal to the first direction) of the yoke 29p, the pulling force 43p is generated. In addition, since the end portion a of the magnet 24p comes close to an end portion A2 of a protrusion 32p of the yoke 29p (an end portion of the protrusion extending in the direction orthogonal to the first direction), the pulling force 44p is also generated. Furthermore, the pulling force 45p is generated between an end portion c (an end portion extending in the direction orthogonal to the first direction) of the magnet 24p and the end portion B1 (the end portion extending in the direction orthogonal to the first direction) of the yoke 29p. The pulling force 41p' in this state is represented as a combined force of the pulling forces 43p, 44p, and 45p (41p'=43p+44p+45p), which is a pulling force in a downward direction in FIG. 4F (the downward direction of the pitch direction).

Figure 4G:
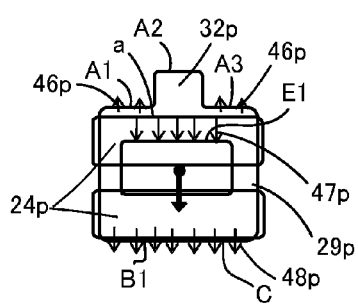

FIG. 4G is a diagram of illustrating the position relation between the magnet 24p and the yoke 29p in the case where the shift member is displaced in the downward direction of the pitch direction relative to the center position of the optical axis (FIG. 4D). Since the end portion a of the magnet 24p (the end portion a that extends in the direction orthogonal to the first direction) is located downward in the drawing with respect to the end portions A1 and A3 of the yoke 29p (the end portions A1 and A3 of the yoke 29p in the direction orthogonal to the first direction), the pulling force 46p is generated. In addition, since the end portion a of the magnet 24p of the magnet 24p becomes close an end portion E1 at the upper side of the protrusion 30p that is located in a center region of the yoke 29p, the pulling force 47p is generated. Furthermore, the pulling force 48p is generated between the end portion c of the magnet 24p (the end portion c of the magnet 24p that extends in the direction orthogonal to the first direction) and the end portion B1 of the yoke 29p (the end portion B1 of the yoke 29p that extends in the direction orthogonal to the first direction). The pulling force 41p" in this state is represented as a combined force of the pulling forces 46p, 47p, and 48p (41p"=46p+47p+48p), which is a pulling force in a downward direction in FIG. 4G (the downward direction of the pitch direction).

As described above, according to the configuration of the present embodiment, even when the shift member is located at any position within a movable range, the pulling force in the downward direction of the pitch direction is generated between the magnet 24p and the yoke 29p in the pitch direction. In other words, the pulling force in the first direction that acts between the magnet 24p and the yoke 29p does not become zero within the movable range of the shift member. Similarly, the pulling force of the second direction that acts between the magnet 24y and the yoke 29y also does not become zero within the movable range of the shift member. Furthermore, in the present embodiment, the pulling force of the first direction that acts between the magnet 24p and the yoke 29p is generated in a certain direction (the downward direction in the drawing) within the movable range of the shift member. A force that pulls the shift member to the center position of the optical axis (a reference position) is always generated in the yaw direction. Similarly, the pulling force of the second direction that acts between the magnet 24y and the yoke 29y is generated in a certain direction (rightward in FIGS. 4B to 4D) within the movable range of the shift member. As a result, the spring characteristics of the pulling force can be kept to be nearly constant within the movable range of the shift member. Therefore, a rolling motion that is generated within the movable range of the shift member can be stabilized, and the controlled performance can be improved by the stabilization of the pulling force for the Lorentz force.

In the present embodiment, each of the yokes 29p and 29y has a convex shape at one side in the driving direction (the pitch direction or the yaw direction), but the embodiment is not limited to this. For example, as illustrated in FIG. 6, both end parts of the yoke 29p extending in the direction orthogonal to the driving direction may also be configured so as to have a convex shape (protrusions 32p and 33p). In FIG. 6, the protrusion 32p having the end portion A2 is provided between the end portions A1 and A3, and also the protrusion 33p having end portions B1 and B2 is provided. The same is true for the yoke 29y. In the present embodiment, the protrusion 30 of the yoke 29 does not have to be provided. The above descriptions of the present embodiment mainly relate to the drive in the pitch direction, but the similar effect can also be obtained for the drive in the yaw direction.

Figure 5:
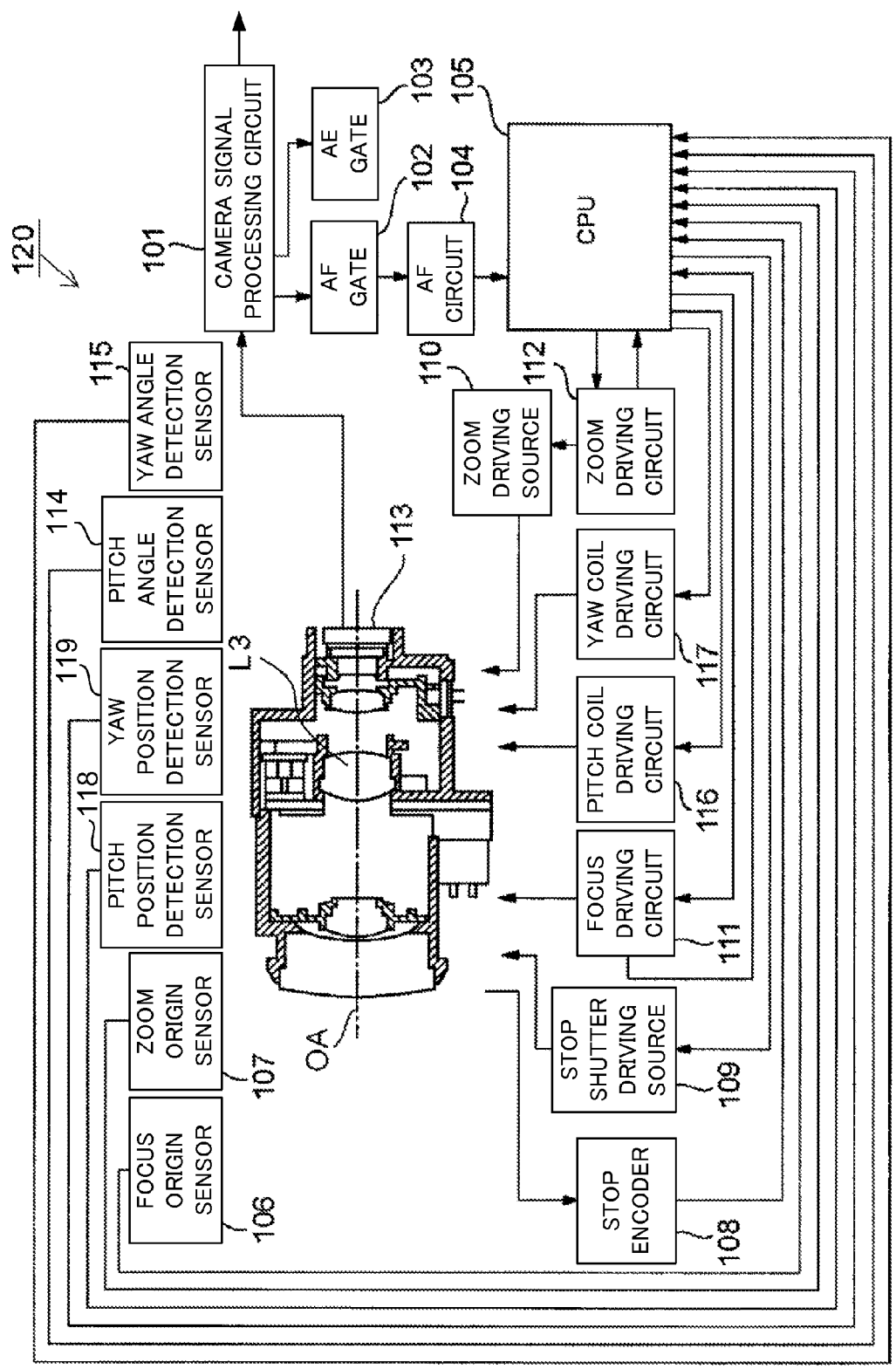
FIG. 5 is a configuration diagram of an optical apparatus that includes a lens barrel in the present embodiment.

Next, referring to FIG. 5, an optical apparatus that includes a lens barrel in the present embodiment will be described. FIG. 5 is a configuration diagram of the optical apparatus (an image pickup apparatus) in the present embodiment. In an optical apparatus 120, an object image that is imaged on a CCD 113 (an image pickup element) via a lens unit (the lens barrel) including the lens L3 is inputted to a camera signal processing circuit 101, and a predetermined processing such as amplification or gamma correction is performed. An output signal (a video signal) from the camera signal processing circuit 101 passes through an AF gate 102 or an AE gate 103, and then a contrast signal in a predetermined region is taken. Especially, for the contrast signal that is obtained by passing through the AF gate 102, one or a plurality of outputs related to a high-frequency component are outputted by an AF circuit 104.

A CPU 105 determines whether an exposure is optimal or not in accordance with a signal level of the AE gate 103. When the exposure is not optimal, the CPU 105 controls a stop shutter driving source 109 so that a shutter is driven using an optimal stop value or a shutter speed via the stop shutter driving source 109. In an auto focus operation, the CPU 105 controls a focus driving circuit 111 that is a focus driving source so that the output generated by the AF circuit 104 indicates a peak value. Furthermore, in order to obtain an appropriate exposure, the CPU 105 controls the stop shutter driving source 109 so that an output of a stop encoder 108 becomes a predetermined value that is an average value of the signal outputs passing through the AE gate 103 so as to control an opening diameter of the stop shutter.

A focus origin sensor 106 using an encoder such as a photo interrupter detects an absolute reference position that is used to detect an absolute position of a focus lens unit in the optical axis direction. A zoom origin sensor 107 using an encoder such as a photo interrupter detects an absolute reference position that is used to detect an absolute position of a zoom lens unit in the optical axis direction. The CPU 105 controls a zoom driving circuit 112 so as to drive a zoom driving source 110 based on information of the zoom origin sensor 107. Detection of a shake angle in the image pickup apparatus is for example performed by integrating an output of an angular velocity sensor such as a vibrating gyro that is fixed on the image pickup apparatus. An output of each of a pitch angle detection sensor 114 and a yaw angle detection sensor 115 is processed by the CPU 105. The CPU 105 controls a pitch coil driving circuit 116 so as to control the current that is applied to the coil 28p (not shown) in accordance with the output from the pitch angle detection sensor 114. Furthermore, the CPU 105 controls a yaw coil driving circuit 117 so as to control the current that is applied to the coil 28y (not shown) in accordance with the output from the yaw angle detection sensor 115.

According to the control described above, the shift moving frame 22 (see FIG. 1) performs a shift movement in the plane orthogonal to the optical axis. The output of each of the pitch position detection sensor 118 and the yaw position detection sensor 119 is processed by the CPU 105. When the lens L3 (a correction lens unit) performs the shift movement, a light beam passing through the lens barrel is bent. Therefore, the lens L3 performs the shift movement so that the passed light beam is bent by a bending amount that is to be compensated in a direction where a displacement of an object image on the CCD 113 that is to be generated by the generation of the shake of the image pickup apparatus is compensated. As a result, a so-called image stabilization in which the imaged object image does not move on the CCD 113 even when the image pickup apparatus is shaken can be performed. The CPU 105 calculates a signal (a differential signal) that corresponds to a difference between a shake signal of the image pickup apparatus obtained by the pitch angle detection sensor 114 and the yaw angle detection sensor 115 and a shift amount signal obtained by the pitch position detection sensor 118 and the yaw position detection sensor 119. Then, the CPU 105 performs amplification and phase compensation for this differential signal so as to perform the shift movement of the shift moving frame 22 using the pitch coil driving circuit 116 and the yaw coil driving circuit 117. According to this control, the positioning control of the lens L3 is performed so that the differential signal is decreased, and the lens L3 is held to be a target position.

In this case, the shift moving frame 22 performs the shift movement by the Lorentz force that is generated between each coil and magnet in accordance with an amount of the current that is applied to the coils in the pitch direction and the yaw direction. However, at the same time, the shift movement is prevented since the pulling force is generated between the magnet and the yoke. If the pulling force that is generated at this time is a constant amount without depending on the shift moving amount of the shift moving frame 22, an appropriate control can be performed since the differential signal is kept to be a constant amount.

In the present embodiment, the case where the shift moving frame 22 is driven using the moving magnet actuator is described, but the embodiment is not limited to this. The present embodiment can also be applied to a case where a so-called moving coil actuator in which the coil 28 and the yoke 29 are disposed at the side of the magnet base 18 and the yoke 23 and the magnet 24 are disposed at the side of the shift base 21.

According to the image stabilizing apparatus of the present embodiment, a rolling motion caused by a rotation moment can be reduced since a pulling force generated between a magnet and a yoke is always generated in a certain direction. In addition, since the pulling force is always stable within a driving range (a movable range), the pulling force for Lorentz force that acts between the magnet and the coil can keep constancy or linearity. Therefore, small-size image stabilizing apparatus, lens barrel, and optical apparatus that reduce a rotation of a shift member in a plane orthogonal to an optical axis can be provided at low cost.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-001064, filed on Jan. 6, 2012, which is hereby incorporated by reference herein in its entirety.

What is claimed is:

1. An image stabilizing apparatus comprising:
  a shift member configured to hold a lens;
  a first driver configured to move the shift member along a first direction along a plane orthogonal to an optical axis with respect to a body; and
  a second driver configured to move the shift member along a second direction that is perpendicular to the first direction along the plane orthogonal to the optical axis with respect to the body,
  wherein the first driver has a first magnet, a first coil, and a first yoke disposed in this order along an optical axis direction,
  wherein the second driver has a second magnet, a second coil, and a second yoke disposed in this order along the optical axis direction,
  wherein the first and second magnets are attached to one of the shift member or the body, and the first and second yokes are attached to the other of the shift member or the body, the first and second magnets being movable relative to the first and second yokes, respectively,
  wherein the first yoke has a first protrusion that protrudes along the first direction from at least one of two opposing sides thereof extending along the second direction,
  wherein the second yoke has a second protrusion that protrudes along the second direction from at least one of two opposing sides thereof extending along the first direction,
  wherein a width along the second direction of the first protrusion is smaller than a width along the second direction of the other of the two opposing sides of the first yoke,
  wherein a width along the first direction of the second protrusion is smaller than a width along the first direction of the other of the two opposing sides of the second yoke,
  wherein a length along the first direction of the first magnet is smaller than a length along the first direction between the two opposing sides of the first yoke, and
  wherein a length along the second direction of the second magnet is smaller than a length along the second direction between the two opposing sides of the second yoke.

2. The image stabilizing apparatus according to claim 1, wherein each of a pulling force along the first direction that acts between the first magnet and the first yoke and a pulling force along the second direction that acts between the second magnet and the second yoke is not zero within a movable range of the shift member.

3. The image stabilizing apparatus according to claim 1, wherein each of a pulling force along the first direction that acts between the first magnet and the first yoke and a pulling force along the second direction that acts between the second magnet and the second yoke is generated in a certain direction within a movable range of the shift member.

4. The image stabilizing apparatus according to claim 1, wherein:
  a width along the second direction of the first magnet is equal to a width along the second direction of one of the two opposing sides of the first yoke, and
  a width along the first direction of the second magnet is equal to a width along the first direction of one of the two opposing sides of the second yoke.

5. The image stabilizing apparatus according to claim 1, wherein:
  a movable range of the first magnet is between the two opposing sides of the first yoke, and
  a movable range of the second magnet is between the two opposing sides of the second yoke extends.

6. The image stabilizing apparatus according to claim 1, wherein:
  the first protrusion of the first yoke protrudes along the first direction from each of the two opposing sides thereof,
  the second protrusion of the second yoke protrudes along the second direction from each of the two opposing sides thereof,
  a movable range of the first magnet is between the two opposing sides, and
  a movable range of the second magnet is between the two opposing sides.

7. The image stabilizing apparatus according to claim 1, further comprising a plurality of balls that are held between the shift member and the body by magnetic pulling forces that act between the first magnet and the first yoke and between the second magnet and the second yoke.

8. The image stabilizing apparatus according to claim 7, wherein the shift member performs a shift movement along the plane orthogonal to the optical axis by a rolling motion of the plurality of balls along the plane orthogonal to the optical axis.

9. A lens barrel comprising:
a lens;
a shift member that holds the lens;
a first driver configured to move the shift member along a first direction along a plane orthogonal to an optical axis with respect to a body; and
a second driver configured to move the shift member along a second direction that is perpendicular to the first direction along the plane orthogonal to the optical axis with respect to the body,
wherein the first driver has a first magnet, a first coil, and a first yoke disposed in this order along an optical axis direction,
wherein the second driver has a second magnet, a second coil, and a second yoke disposed in this order along the optical axis direction,
wherein the first and second magnets are attached to one of the shift member or the body, and the first and second yokes are attached to the other of the shift member or the body, the first and second magnets being movable relative to the first and second yokes, respectively,
wherein the first yoke has a first protrusion that protrudes along the first direction from at least one of two opposing sides thereof extending along the second direction,
wherein the second yoke has a second protrusion that protrudes along the second direction from at least one of two opposing sides thereof extending along the first direction,
wherein a width along the second direction of the first protrusion is smaller than a width along the second direction of the other of the two opposing sides of the first yoke,
wherein a width along the first direction of the second protrusion is smaller than a width along the first direction of the other of the two opposing sides of the second yoke,
wherein a length along the first direction of the first magnet is smaller than a length along the first direction between the two opposing of the first yoke, and
wherein a length along the second direction of the second magnet is smaller than a length along the second direction between the two opposing sides of the second yoke.

10. An optical apparatus comprising:
an image pickup element;
a lens;
a shift member that holds the lens;
a first driver configured to move the shift member along a first direction along a plane orthogonal to an optical axis with respect to a body; and
a second driver configured to move the shift member along a second direction that is perpendicular to the first direction along the plane orthogonal to the optical axis with respect to the body,
wherein the first driver has a first magnet, a first coil, and a first yoke disposed in this order along an optical axis direction,
wherein the second driver has a second magnet, a second coil, and a second yoke disposed in this order along the optical axis direction,
wherein the first and second magnets are attached to one of the shift member or the body, and the first and second yokes are attached to the other of the shift member or the body, the first and second magnets being movable relative to the first and second yokes, respectively,
wherein the first yoke has a first protrusion that protrudes along the first direction from at least one of two opposing sides thereof extending along the second direction,
wherein the second yoke has a second protrusion that protrudes along the second direction from at least one of two opposing sides thereof extending along the first direction,
wherein a width along the second direction of the first protrusion is smaller than a width along the second direction of the other of the two opposing sides of the first yoke,
wherein a width along the first direction of the second protrusion is smaller than a width along the first direction of the other of the two opposing sides of the second yoke,
wherein a length along the first direction of the first magnet is smaller than a length along the first direction between the two opposing sides of the first yoke, and
wherein a length along the second direction of the second magnet is smaller than a length along the second direction between the two opposing sides of the second yoke.

* * * * *